United States Patent [19]

Northup

[11] 4,276,073
[45] Jun. 30, 1981

[54] METHOD OF FORMING GLASS BOTTLES

[75] Inventor: John D. Northup, Toledo, Ohio

[73] Assignees: Ruth B. Northup; John D. Northup, Jr.; Nancy Northup Lehrkind; Mary E. Northup, ; part interest to each

[21] Appl. No.: 112,846

[22] Filed: Jan. 17, 1980

[51] Int. Cl.³ ............................................. C03B 9/20
[52] U.S. Cl. ........................................ 65/77; 65/68; 65/81; 65/263
[58] Field of Search ................... 65/68, 77, 78, 79, 80, 65/81, 82, 261, 262, 263

[56] References Cited

U.S. PATENT DOCUMENTS

| 2,118,793 | 5/1938 | Howard. | |
|---|---|---|---|
| 3,184,297 | 5/1965 | Zonneveld | 65/262 X |
| 3,252,782 | 5/1966 | Moreau | 65/82 X |

FOREIGN PATENT DOCUMENTS 616192  1/1949  United Kingdom .................. 65/81

*Primary Examiner*—Arthur D. Kellogg
*Attorney, Agent, or Firm*—Oliver E. Todd, Jr.

[57] ABSTRACT

A method of forming glass bottles from a short parison is disclosed, which method includes the steps of mechanically elongating the parison in a blow mold to an extent that the exterior bottom of the elongated parison is near, but not at, the bottom of the blow mold cavity and subsequently expanding the elongated parison by vacuum on its exterior and/or by air pressure on its interior, and finally removing the blown bottle from the blow mold.

12 Claims, 5 Drawing Figures

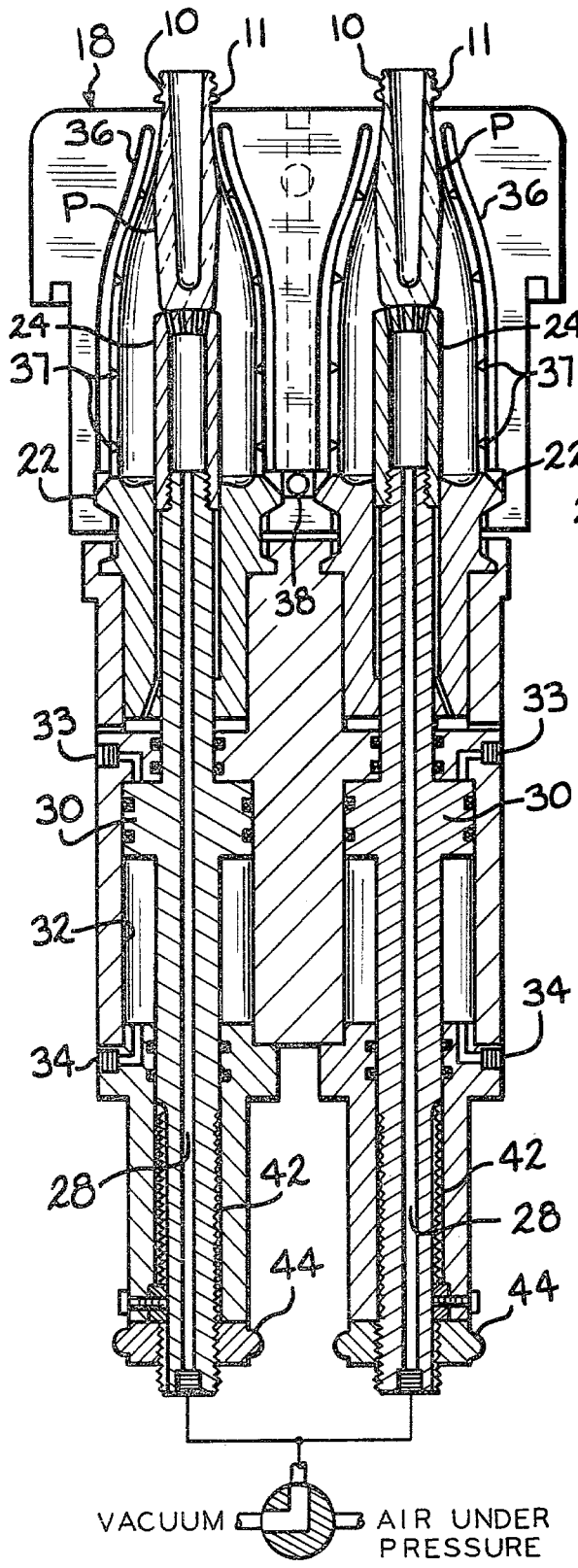
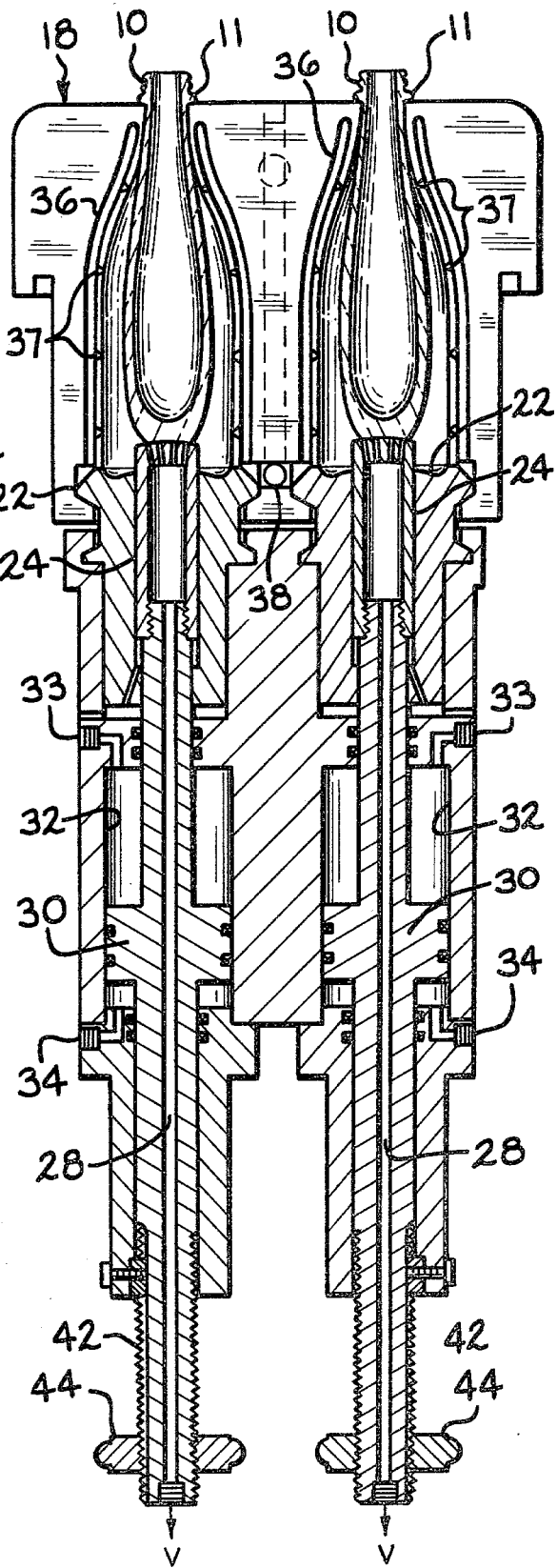

METHOD OF FORMING GLASS BOTTLES

BACKGROUND OF THE INVENTION

The desirability of making glass containers of very light weight without sacrificing the strength of the container has long been known. The container that is most extensively produced in the United States is the 12 ounce beer bottle. As presently manufactured, this bottle weighs about 7 to 7¼ ounces. It is, however, characterized by large and easily measured variations in wall thickness. The areas of minimum thickness must be strong enough that the bottle will withstand all of the known test procedures to insure that it will perform satisfactorily on a capping machine and will not break when subjected to mechanical abuse and the stresses arising from increased internal pressure caused by prolonged exposure of its contents to a hot environment. If the minimum thickness areas are sufficiently strong, it is apparent that any thicker areas represent a waste of material and the energy required to produce it.

Prior art bottles are produced by forming a parison that is only slighter shorter than the height of the blow mold cavity in which the bottle is finally formed. This parison is introduced into a blow mold, permitted to "run" by its own weight and fluidity for a predetermined time and then blown, usually by introducing high pressure air into the interior of the parison to expand it into intimate contact with the interior of the blow mold.

A "short" parison (75% or less of blow mold cavity height) is formed more easily and uniformly on the blank side because of its lower ratio of length to average diameter. A shorter parison can also be transferred to the final blow mold cavity faster and with less distortion in the inventing because the effect of the centrifugal and gravitational forces acting on the parison during this time is accentuated by the distance of the center of gravity of the parison from the point of intersection of the invert arm radius with the center line of the parison. Furthermore, in reducing the weight of a given bottle to the absolute practical minimum there is just not enough mass of glass available to make a parison of the conventional length and design. When the glass gob contacts the blank mold the glass surface cools at the rate of 1700° C. (3100° F.) per second. This means that in 0.1 seconds it loses 170° C. (310° F.) so the short parison with its lesser ratio of surface to mass is necessary to prevent the glass mass from cooling so fast as to cause a structural failure of the material or a stiffness that makes it unworkable.

The short parisons used in my invention may be produced by an improved parison forming method, described in my copending application, Ser. No. 112,845, filed Jan. 17, 1980.

A "short" parison requires so much remelt time and "run" time (because it has more than five times as much distance to "run" and less gravitational force due to its lesser weight) that its operation by conventional means would be uneconomic from a production speed standpoint.

In order that the rate of production of bottles of more uniform wall thickness by equal to or greater than the rate of production of conventional machines, I have proposed that a plurality of blow molds be associated with each blank mold. Such an apparatus should be compatible with the forming stations of a conventional Hartford IS machine because of their widespread use in the industry. Such an apparatus is shown, described and claimed in my copending application, Ser. No. 42,455, filed May 25, 1979.

STATEMENT OF THE INVENTION

The present invention comprises a method of making glass bottles comprising, introducing a short parison into a blow mold, mechanically stretching the parison to a point where the bottom of the parison is close to, but not at, the bottom of the blow mold, releasing the stretching mechanism from contact with the parison, and expanding the parison by vacuum on its exterior and/or by compressed air introduced into its interior.

BRIEF DESCRIPTION OF THE DRAWINGS

FIG. 2 is a central vertical sectional view of the apparatus at the time when the parisons have been moved to the blow mold and released from the transfer mechanism;

FIG. 3 is a view similar to FIG. 2 with the parisons stretched in the blow molds;

DESCRIPTION OF THE PREFERRED EMBODIMENT

Figure 1:
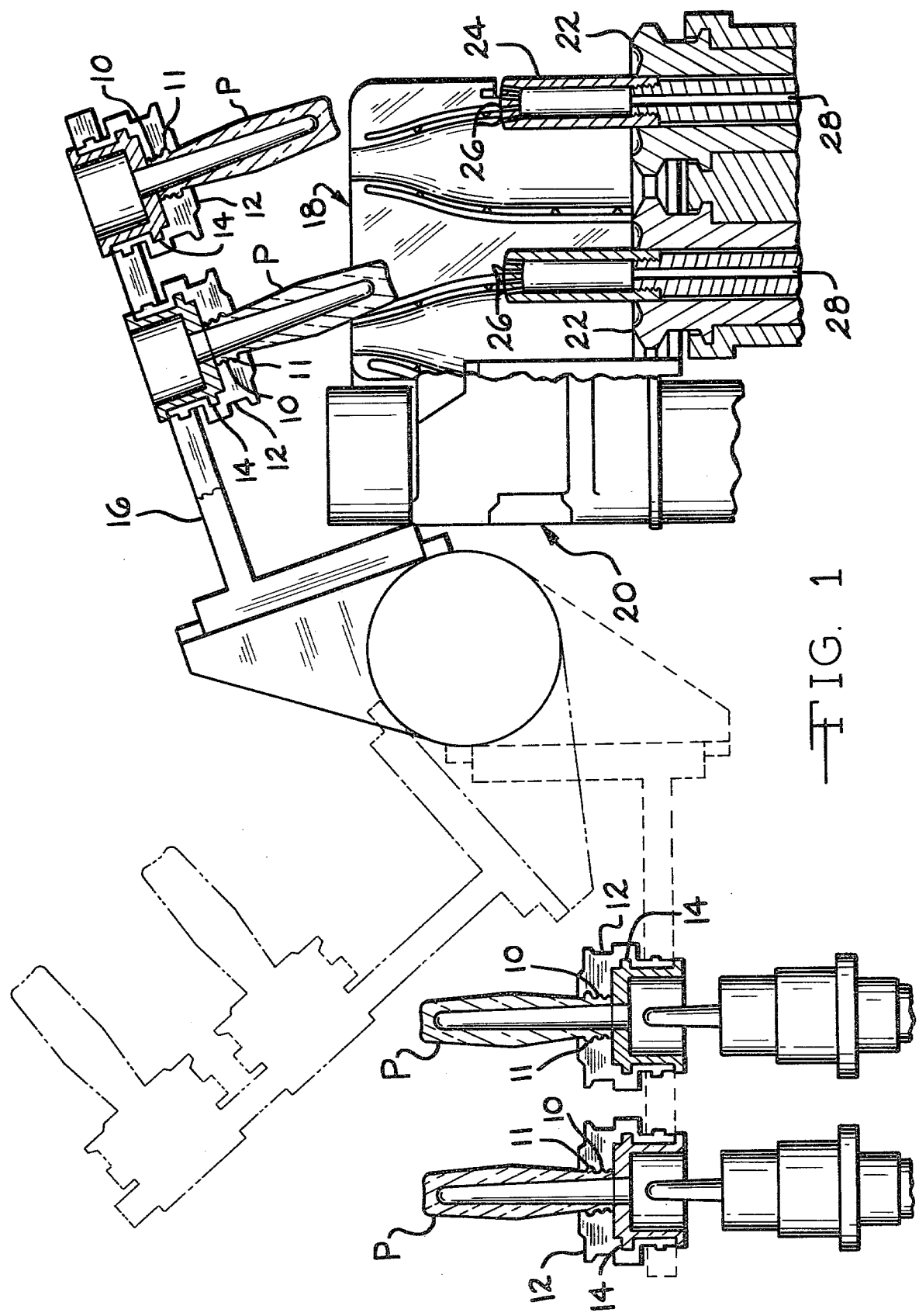
FIG. 1 is a diagrammatic view, with parts shown in central vertical section, of an apparatus used in carrying out the present method and showing the step of transferring a parison from a blank mold into a blow mold. The present apparatus has a double parison.

The apparatus necessary to carry out the method of the present invention can take various forms. Those skilled in the art will recognize that much of the apparatus is conventional and therefore is shown somewhat diagrammatically in the drawings.

As will be seen in FIG. 1 at the left, a parison P has been formed in a blank mold and is supported at the "finish" end 10 by a split neck ring 12. There is an enlarged flange 11 below the "finish" end 10 for a purpose which will become apparent. A guide ring 14 is associated with the neck ring 12. The guide ring 14 and neck ring 12 are supported by a conventional transfer arm 16 which takes the parison P from the blank mold, transfers and inverts them into the position where they can enter a blow mold 18.

The parison P has been formed with a deep center cavity.

The transfer arm 16 swings the parisons P over to a position where they enter the split blow mold 18. The blow mold 18 is supported by a conventional post 20 and operated by conventional mechanism.

The blow mold bottom plate is designated 22 and in the center thereof the present invention utilizes a plunger 24 which is moveable from a position coincident with the bottom plate 22 to a position where the plunger extends up to a height nearly equal to the entry position of the parisons P.

The central plunger 24 is provided with a series of small holes 26, small enough that the glass cannot flow into them but which are sufficient in size and number to cause the top of the plunger 24 to have a vacuum engagement with the bottom of the parison as hereinafter described.

A vacuum passage 28 communicates with the interior of the central plunger plate 24 so that at the desired point in the cycle, as shown in FIG. 2, the plunger 24 will communicating through the holes 26, have a vacuum engagement with the bottom of the parison 10 as vacuum is established in the passage 28.

As shown in FIG. 3, the central plunger 24 can be raised and lowered by an operating piston 30 working in an operating cylinder 32. When air is introduced into the top of the cylinder through passage 33, the piston 30 will be lowered. When air is introduced into the lower passage 34, the operating piston will be raised.

As indicated in FIG. 3, the combination of the vacuum engagement between the plunger 24 and the exterior bottom of the parison P, the downward movement of the plunger 24, and the seating of the finish flange 11 on the top of the blow mold 18 produces a mechanical stretch of the parison P. This stretching is continued until the exterior bottom of the parison P has reached a point near, but not at, the bottom plate 22 of the blow mold. During the stretching process the parison P is caused to expand slightly to an intermediate position as shown in FIG. 3 by the application of a small puff of air through the finish opening or the application of a slight vacuum applied through the seams and vents of the blow mold 18.

When the parison has been stretched to the desired extent the vacuum in passage 28 is cut off and pressure in this passage is raised to an amount slightly above atmospheric to cause the tip of the plunger 24 to release promptly from the bottom of the parison.

Figure 4:
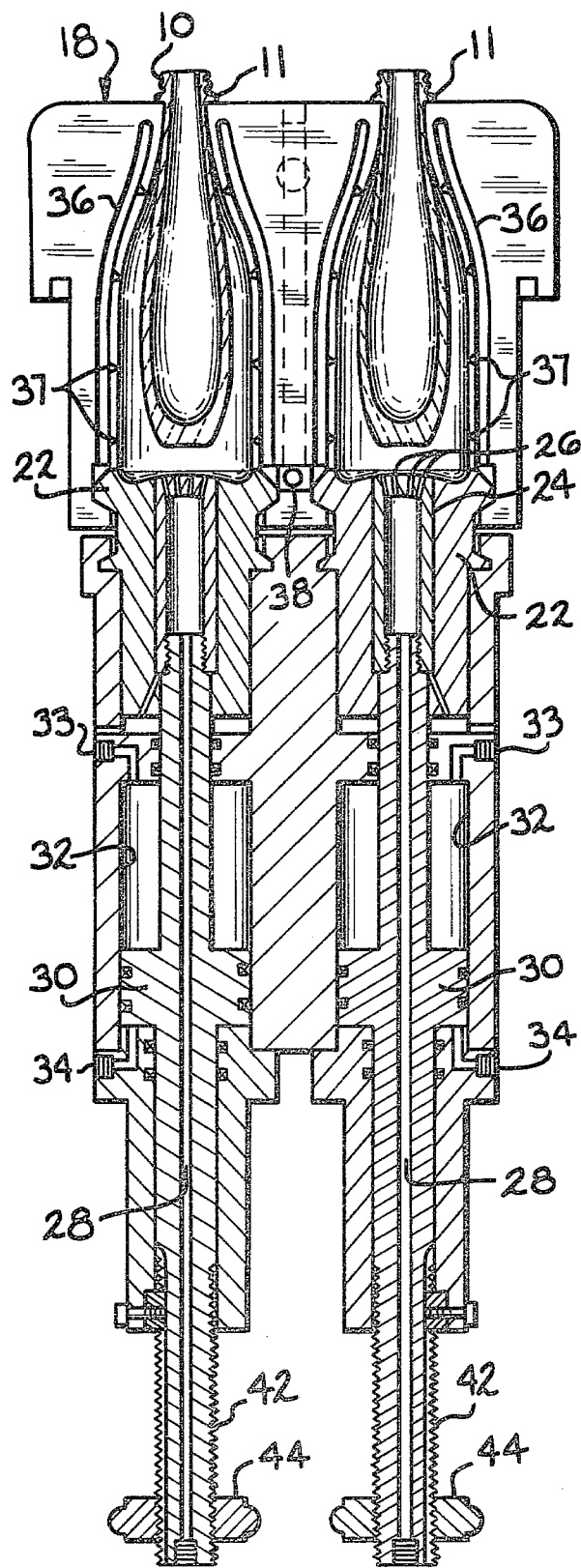
FIG. 4 is a view similar to FIG. 3 with the parisons in the blow molds after having been stretched and with the stretching mechanisms released.

The next step in the method is to lower the plunger 24 to a point where it forms a portion of the blow mold bottom plate 22. This is accomplished by introduction of additional operating air into the upper passage 33 communicating with the top of the operating cylinder 32, and results in the situation shown in FIG. 4.

The next step in the process is to blow the bottle so that its walls are in intimate contact with the walls of the blow mold and the bottle has the configuration of the mold. Preferably this is done by evacuating the blow mold as is well known in the art. The vacuum passage 36 which surrounds the blow mold communicates with the interior thereof through a plurality of small passages 37 and the vacuum chamber 36 communicates with a passage 38 and, therethrough with a source of vacuum.

Instead of using vacuum, it will be apparent to those skilled in the art that the final step of blowing the bottle in the blow mold may be accomplished by introducing air into the interior of the partially expanding parison. In the present process, it is preferred that low pressure air be used, low pressure meaning air at 50 PSI or less.

Below the operating piston 30 the plunger 24 is provided with a threaded area 42 and an adjustment wheel 44 by which the upper, intermediate, the lower positions of plunger 24 can be adjusted. Numerous devices can be used for this purpose. Adjusting wheel 44 contacts the bottom of the main housing in its upper position and this limits the upper position of the plunger 24. The lower position is determined by the piston 30 which will strike the bottom of the cylinder 32.

As shown in FIG. 1, the parisons P are taken from the blank mold section by inverting arm 16 and swung around to a position over the blow molds 18, supported by the neck ring 12 and guide ring 14, both of which are split elements and which release the parison P as shown in FIG. 2. Thereafter, these elements are removed and returned to the blank mold to pick up the next set of parisons.

The parisons P engage the upper surface of the plunger 24 and are mechanically stretched by establishing a vacuum in the interior of the plunger and through the small holes 26. The vacuum engagement is sufficient to cause a virtual adherance between the bottom of the parison P and the top of the plunger 24. When the plunger 24 is lowered the parison P is stretched as shown in FIG. 3 and a slight puff of air may be introduced into the interior of the parison P and/or a vacuum is applied to the exterior of the parison to cause a slight bulging of the parison P. The parisons P have side walls of very uniform thickness because they have been pressed with a precisely placed center bubble therein and this uniformity is not disturbed by the stretching of the parisons. Therefore, as the parisons P are partially expanded to the position shown in FIG. 3, the glass distribution remains uniform in the sidewalls. In this position the parisons P, as above noted, are supported by the flange 11 at the finish end 10 which engages the top of the blow mold 18. There is additional glass in the lower end of the parisons in their stretched condition. This glass is needed to form the bottom of the bottles when the parisons P are fully expanded.

Figure 5:
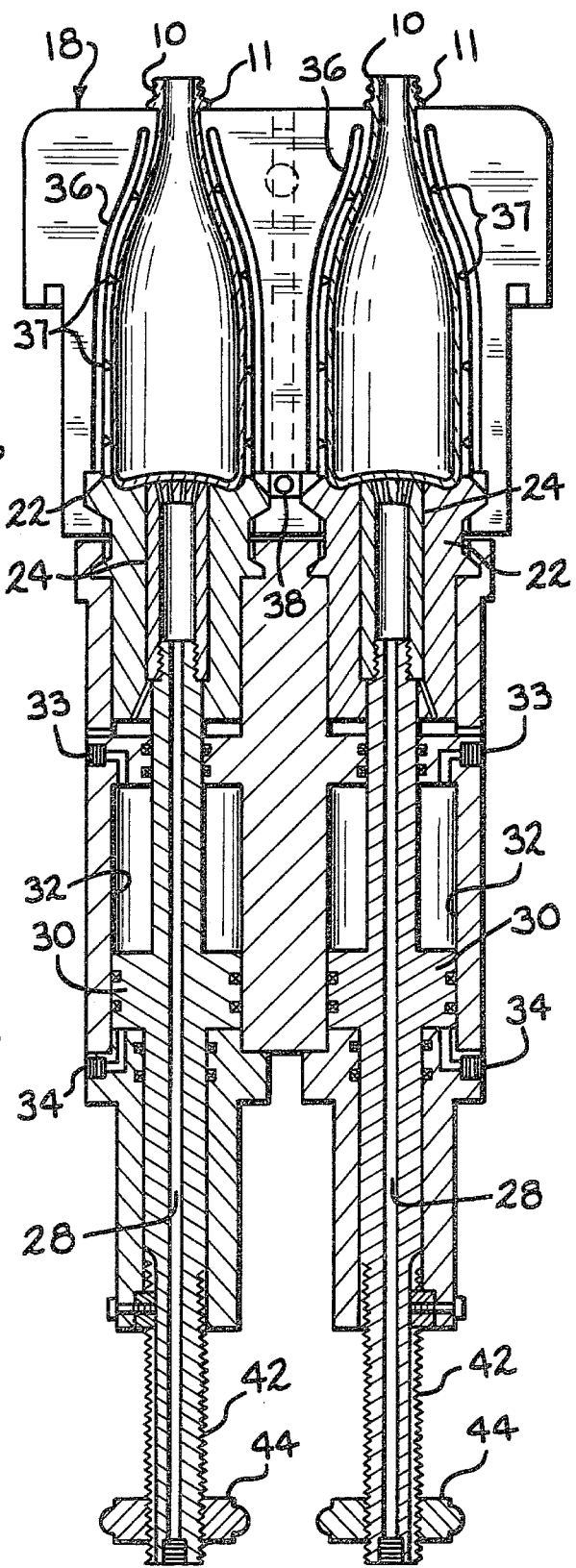
FIG. 5 is a view similar to FIG. 4 with the parisons blown into bottles and ready for removal from the blow molds.

Once the parisons P have been drawn down to the predetermined intermediate position, the plungers 24 are released from engagement with the parisons P by breaking the vacuum and introducing a slight positive air pressure into the passages 28. Any suitable valve may be used for this purpose as indicated by a conventional three-way valve in FIG. 2. Thereafter, the top surface of each plunger 24 becomes a part of the bottom plate 22 of the blow mold 18 so that when the bottles are expanded by vacuum or compressed air to the position shown in FIG. 5, the bottom configuration of the finished bottle is of the desired form. Because the parison sidewalls have been of very uniform thickness prior to blowing and blowing is accomplished by vacuum or by low air pressure, the uniform sidewall thickness will remain. The bottom thickness is controlled by the quantity of glass left in the parison P after the same has been stretched to the position shown in FIG. 4, and by adjustment of the position at which the stretching action is stopped.

By the method of the present invention a bottle, which is currently being marketed at from $7\frac{1}{4}$ to $7\frac{3}{8}$ ounces in weight, can be made using only approximately 4 ounces of glass. This represents a very substantial saving both in the glass raw materials; in the energy required to produce the bottle; and in shipping costs for the finished articles. A case of twenty-four beer bottles is reduced in weight by almost five pounds or more than two kilograms.

What I claim is:

1. A method of forming a glass bottle which includes:
    introducing into a blow mold a parison having a central bubble therein, which parison has a height less than 75% of the height of the blow mold cavity;
    engaging a bottom of the parison with a gripping mechanism;
    mechanically stretching the parison to a position close to, but not at, the lower surface of the mold cavity by moving the gripping mechanism;
    releasing the gripping mechanism from contact with the parison to allow the parison bottom to reheat;
    expanding the parison to the configuration of the blow mold; and removing the blown bottle from the blow mold.

2. A method of forming a glass bottle, according to claim 1, in which the parison is partially expanded to an intermediate shape prior to releasing the gripping mechanism by introducing compressed air to the interior of the parison.

3. A method of forming a glass bottle, according to claim 1, in which the parison is partially expanded to an intermediate shape prior to releasing the gripping mechanism by applying a vacuum pressure to the exterior of the parison.

4. A method of forming a glass bottle, according to claim 1, where the parison is expanded to the configuration of the blow mold by applying a vacuum pressure to the exterior of the parison.

5. A method of forming a glass bottle, according to claim 1, where the parison is expanded to the configuration of the blow mold by introducing compressed air to the interior of the parison.

6. A method of forming a glass bottle which includes:
   introducing into a blow mold a parison having a central bubble therein, which parison has a height less than 75% of the height of the blow mold cavity;
   engaging a bottom of the parison with a gripping mechanism;
   mechanically stretching the parison to a position close to, but not at, the lower surface of the blow mold cavity by moving the gripping mechanism and simultaneously partially expanding the parison;
   releasing the gripping mechanism from contact with the parison to allow the parison bottom to reheat;
   expanding the parison to the configuration of the blow mold; and
   removing the blown bottle from the blow mold.

7. A method of forming a glass bottle, according to claim 6, in which the parison is at least partially expanded by applying a vacuum or negative pressure on the exterior of the parison.

8. A method of forming a glass bottle which includes:
   introducing into a blow mold a parison having a central bubble therein, which parison has a height less than 75% of the height of the blow mold cavity;
   engaging a bottom of the parison with a gripping mechanism;
   mechanically stretching the parison to a position close to, but not at, the lower surface of the mold cavity by moving the gripping mechanism;
   partially expanding the parison;
   releasing the gripping mechanism from contact with the parison to allow the parison bottom to reheat;
   expanding the parison to the configuration of the blow mold; and
   finally removing the blown bottle from the blow mold.

9. A method of forming a glass bottle by the press and blow process which includes:
   introducing into a blow mold a parison having a pressed central bubble therein, which parison has a height less than 75% of the height of the blow mold cavity;
   engaging a bottom of the parison with a gripping mechanism;
   mechanically stretching the parison to a position close to, but not at, the lower surface of the mold cavity by moving the gripping mechanism;
   introducing air into the parison bubble to partially expand the parison to an intermediate shape;
   releasing the gripping mechanism from contact with the parison to allow the parison bottom to reheat;
   expanding the parison to the configuration of the blow mold; and
   removing the blown bottle from the blow mold.

10. A method of forming a glass bottle, according to claim 9, in which the parison is expanded to the configuration of the blow mold by applying a vacuum or negative pressure on the exterior of the parison.

11. A method of forming a glass bottle by the press and blow process which includes:
    introducing into a blow mold a parison having a pressed central bubble therein, which parison has a height less than 75% of the height of the blow mold cavity;
    engaging a bottom of the parison with a gripping mechanism;
    mechanically stretching the parison to a position close to, but not at, the lower surface of the mold cavity by moving the gripping mechanism;
    simultaneously introducing air into the parison bubble to partially expand the parison to an intermediate shape;
    releasing the gripping mechanism from contact with the parison to allow the parison bottom to reheat;
    expanding the parison to the configuration of the blow mold; and
    removing the blown bottle from the blow mold.

12. A method of forming a glass bottle, as set forth in claim 1, 6, 8, 9 or 11, and wherein said parison is mechanically stretched by advancing a portion of the blow mold into contact with the parison, applying a vacuum through said advanced portion to hold the parison against said advanced portion and simultaneously partially retracting said advanced portion and wherein the step of releasing the gripping mechanism includes the step of totally retracting the advanced portion to form the blow mold configuration.

* * * * *